(12) United States Patent
Fukui (10) Patent No.: US 7,059,989 B2
(45) Date of Patent: Jun. 13, 2006

(54) BOTTOM BRACKET STRUCTURE WITH DYNAMO

(75) Inventor: Seiji Fukui, Shimonoseki (JP)

(73) Assignee: Shimano Inc., Osaka (JP)

( * ) Notice: Subject to any disclaimer, the term of this patent is extended or adjusted under 35 U.S.C. 154(b) by 93 days.

(21) Appl. No.: 10/879,535

(22) Filed: Jun. 30, 2004

(65) Prior Publication Data

US 2006/0003860 A1    Jan. 5, 2006

(51) Int. Cl.
   *F16H 48/06* (2006.01)
(52) U.S. Cl. .................. 475/149; 280/212; 290/1 R; 310/67 A
(58) Field of Classification Search ............ 475/50, 475/149, 153, 3, 4, 5; 310/67 A, 67 R; 180/65.6, 180/65.7; 290/1 R; 280/212
   See application file for complete search history.

(56) References Cited

U.S. PATENT DOCUMENTS 2,553,465 A * 5/1951 Monge ..................... 475/3
5,115,159 A * 5/1992 Takamiya et al. ......... 310/67 A
5,600,191 A * 2/1997 Yang ........................ 310/67 R
6,002,187 A * 12/1999 Ohkura et al. ............ 310/67 A
6,104,096 A * 8/2000 Hicks ....................... 290/1 R
6,296,072 B1 * 10/2001 Turner ..................... 180/220

FOREIGN PATENT DOCUMENTS

| FR | 2276980 A | * | 3/1976 |
| JP | 55-141954 A | | 11/1980 |
| JP | 55141954 A | * | 11/1980 |
| JP | 55144744 A | * | 11/1980 |

* cited by examiner

*Primary Examiner*—Rodney H. Bonck
*Assistant Examiner*—Justin K. Holmes
(74) *Attorney, Agent, or Firm*—Global IP Counselors (57) ABSTRACT

A bicycle bottom bracket structure is provided that has a dynamo for generating electricity when the rider is pedaling the bicycle. The dynamo has a stationary part fixed to a portion of a bicycle frame and a rotational part coupled to rotate relative to the portion of the bicycle frame. Preferably, the rotational part of the dynamo is coupled to an axle of the bicycle bottom bracket structure via a planetary gear unit. Thus, the planetary gear unit is coupled between the axle and the rotational part of the dynamo such that the rotational part of the dynamo rotates faster than the axle.

17 Claims, 10 Drawing Sheets

BOTTOM BRACKET STRUCTURE WITH DYNAMO

BACKGROUND OF THE INVENTION

1. Field of the Invention

This invention generally relates to a bicycle with a dynamo or electric generating mechanism. More specifically, the present invention relates to a dynamo or electric generating mechanism installed in a bicycle bottom bracket.

2. Background Information

Bicycling is becoming an increasingly more popular form of recreation as well as a means of transportation. Moreover, bicycling has become a very popular competitive sport for both amateurs and professionals. Whether the bicycle is used for recreation, transportation or competition, the bicycle industry is constantly improving the various components of the bicycle to make the bicycle easier to operate and more enjoyable to ride.

Recently, bicycles have been equipped with electrical components to make riding easier and more enjoyable for the rider. Such bicycles are sometimes provided with a front lamp, electrical shifter, electrical derailleur or other electric devices. These electrical devices often need a constant supply of electrical energy. Some bicycles are provided with batteries for supplying of electrical energy to these electric devices. However, batteries have a limited lifespan. Thus, to prevent the necessity of batteries, many bicycles are provided with an electricity generating mechanism for supplying of electrical energy to these electric devices. This electricity generating mechanism is often installed in the front hub for supplying electric power to the electric devices. The electricity generating mechanism generates electricity using the rotation of the front wheel and the electric power is delivered to the electric device through the lead wire (see for example, Japanese Laid-Open Patent Publication No. 2001-213104). While positioning the electricity generating mechanism in the front hub of the wheel works very well, the electricity generating mechanism can slow the rotation of the front wheel when the rider is coasting.

It has also been proposed to install a dynamo (electricity generating mechanism) in the bottom bracket area of the bicycle so that electricity is generated by rotating the crank shaft of the bicycle (See for example, Japanese Laid Open Patent Publication No. 55-141954). However, installing the electricity generating mechanism in the bottom bracket can result in insufficient electricity being generated when the rider is pedaling slowly.

In view of the above, it will be apparent to those skilled in the art from this disclosure that there exists a need for an improved bicycle bottom bracket structure. This invention addresses this need in the art as well as other needs, which will become apparent to those skilled in the art from this disclosure.

SUMMARY OF THE INVENTION

One object of the present invention is to provide a bicycle bottom bracket structure with an electricity generating mechanism that is capable of generating sufficient energy to operate one or more electric devices.

Another object of the present invention is to provide a bicycle bottom bracket structure that is simple and inexpensive to manufacture and assemble.

Another object of the present invention is to provide a bicycle bottom bracket structure that uses a planetary gear unit.

The foregoing objects can basically be attained by providing a bicycle bottom bracket structure that comprises an axle, a dynamo and a planetary gear unit. The axle has a first end and a second end. The dynamo is mounted to the axle, and has a stationary part and rotational part. The planetary gear unit is coupled between the axle and the rotational part of the dynamo such that the rotational part of the dynamo rotates faster than the axle.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Referring initially to FIGS. 1–5, a bicycle 10 is illustrated with a bicycle bottom bracket structure 12 in accordance with a first embodiment of the present invention. The bottom bracket structure 12 is mounted in a bottom bracket tube 14 of a bicycle frame 16. The bottom bracket structure 12 has a right crank arm 18 and a left crank arm 20 fixedly coupled to opposite ends of the bottom bracket structure 12. The remaining parts of the bicycle 10 are conventional, and thus, the remaining parts of the bicycle 10 will not be discussed and/or illustrated in detail herein, except as they relate to the bottom bracket structure 12. Moreover, it will be apparent to those skilled in the art from this disclosure that various modifications can be made to the various components or parts of the bicycle 10 without departing from the scope of the present invention.

Figure 1:
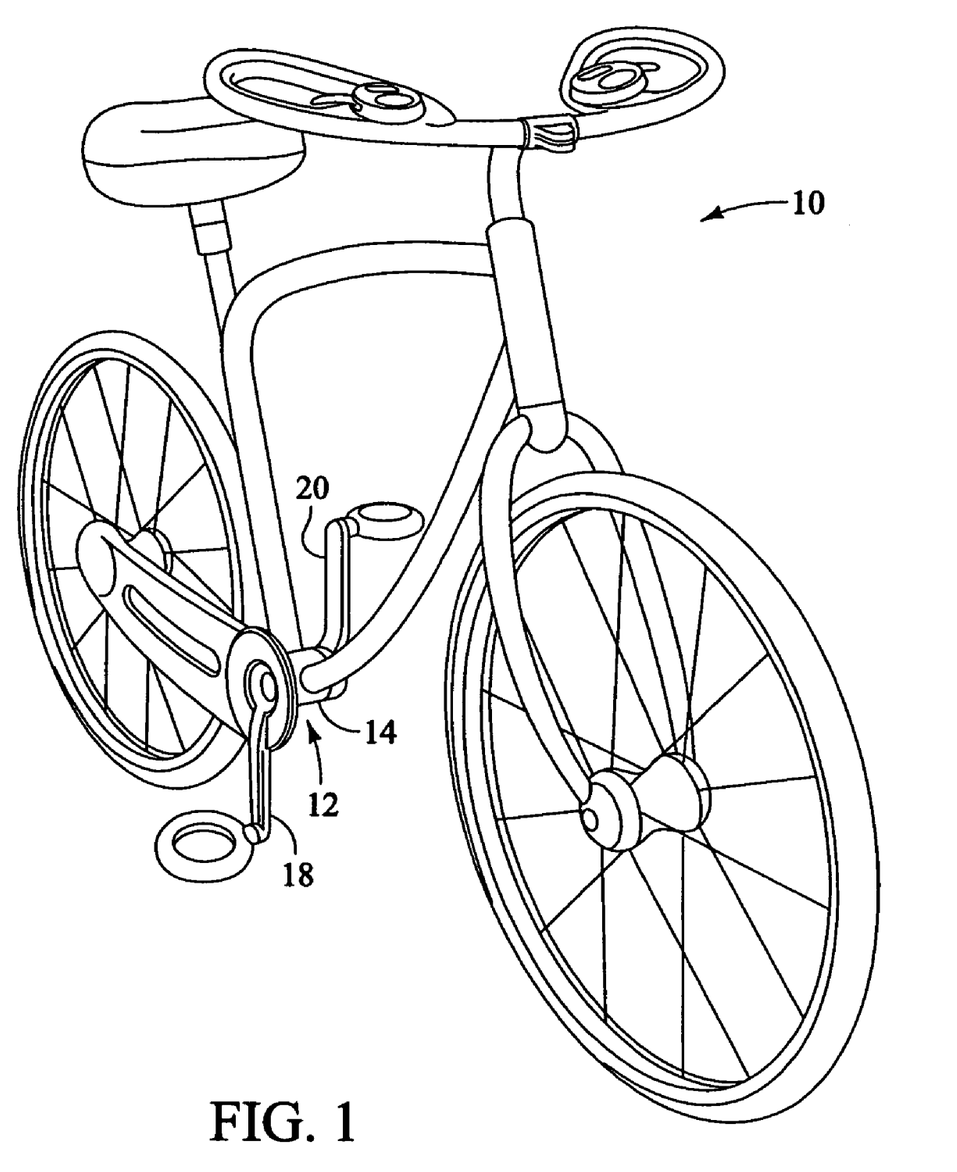
FIG. 1 is a perspective view of a bicycle with a bicycle bottom bracket structure in accordance with a first embodiment of the present invention.
Figure 2:
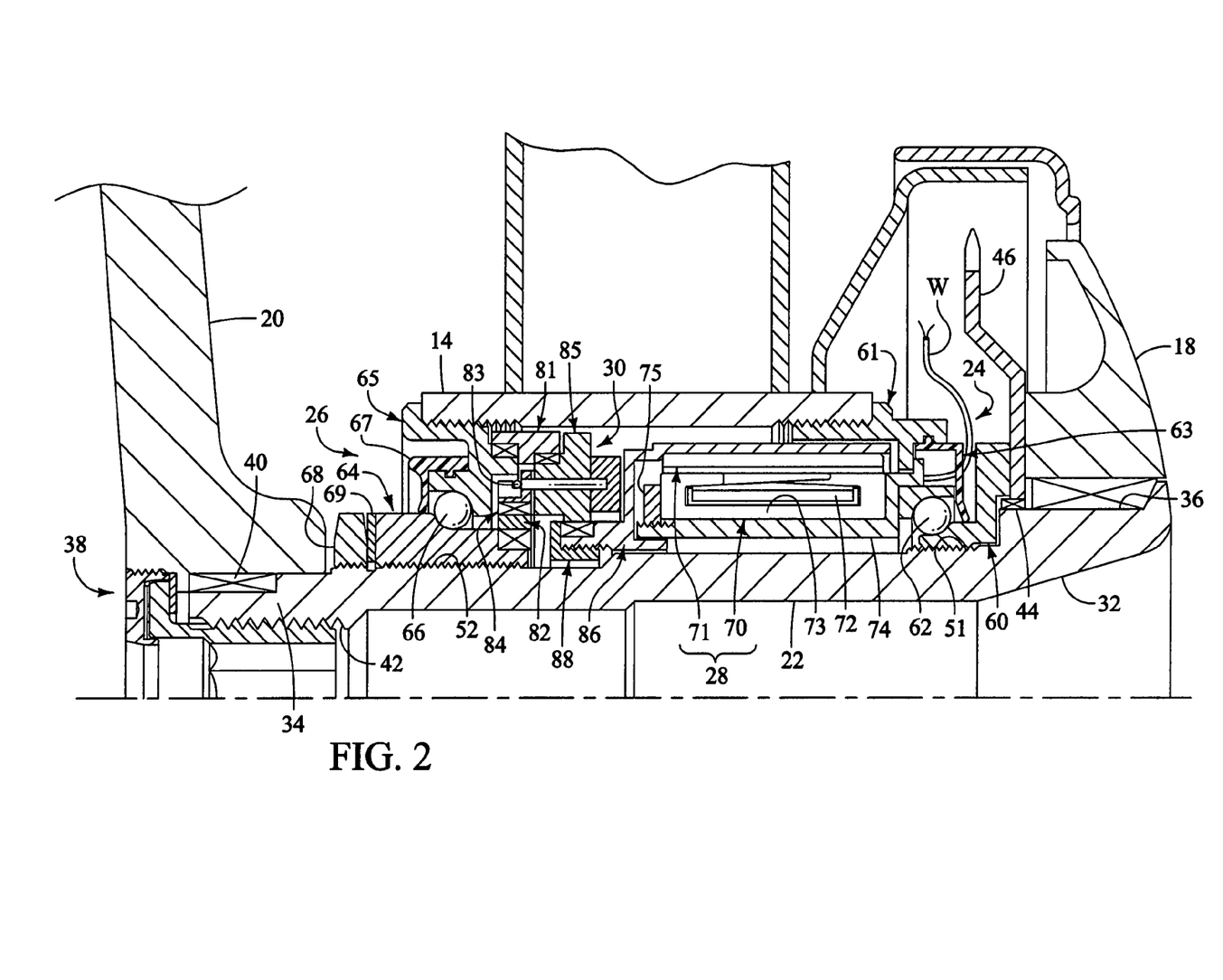
FIG. 2 is a partial longitudinal cross-sectional view of the bicycle bottom bracket structure illustrated in FIG. 1 in accordance with the first embodiment of the present invention.

As best seen in FIG. 2, the bicycle bottom bracket structure 12 basically comprises an axle 22, a first end mounting structure 24, a second end mounting structure 26, a dynamo or electric generating mechanism 28 and a planetary gear unit 30. The dynamo 28 is configured and arranged for generating electricity when the rider is pedaling the bicycle 10. Basically, as explained below, the planetary gear unit 30 is coupled between the axle 22 and the dynamo 28 such that the dynamo 28 is rotated at a faster speed than the axle 22.

The axle 22 is rotatably supported within the bottom bracket tube 14 by the first and second end mounting structures 24. Also, the right and left crank arms 18 and 20 are fixedly coupled to opposite ends of the axle 22. Preferably, the axle 22 is constructed of a hard rigid material that is conventionally used for forming axles of bottom brackets such as a hard rigid metal material. In the illustrated embodiment, the axle 22 is a tubular member having a first or right end 32 and a second or left end 34.

The right crank arm 18 is fixedly mounted to the right end 32 of the axle, while the left crank arm 20 is fixedly coupled to the left end 34 of the axle 22. In particular, the outer surface of the axle 22 is provided with a set of annular serrations or splines 36 that mate with corresponding splines of the right crank arm 18. The right crank arm 18 is held on the splines 36 by an axial force of the first end mounting structure 24 as explained below. The left crank arm 20 is fixed to the left end 34 of the axle 22 by a fastener arrangement 38. More specifically, the left end 34 of the axle 22 is provided with a plurality of serrations or splines 40 disposed on its outer peripheral surface, and a set of internal threads 42 formed in the inner bore at the left end 34. Accordingly, the left crank arm 20 has corresponding serrations or splines that mate with the splines 40 formed on the left end 34 of the axle 22 to prevent relative rotation. The fastener arrangement 38 engages the internal threads 42 to fixedly retain the left crank arm 20 to the left end 34 of the axle 22.

The outer peripheral surface of the axle 22 is further configured and arranged to accommodate the first and second end mounting structures 24 and 26 for securing the axle 22 to the bottom bracket tube 14. In particular, the outer peripheral surface of the axle 22 is a step-shaped arrangement with the largest diameter or width being formed at the first end 36 and the smallest diameter or width being formed at the second end 34. Thus, the outer peripheral surface of the axle 22 that includes the splines 36 has the largest diameter or width, while the outer peripheral surface of the axle 22 with the splines 40 has the smallest diameter or width.

Preferably, the outer peripheral surface further includes a plurality of serrations or splines 44 located adjacent splines 36 that are configured and arranged to fixedly secure one or more sprockets 46 (only one shown). The outer peripheral surface of the axle 22 preferably also includes a first set of external threads 51 located adjacent the first end 36 of the axle 22 and a second set of external threads 52 located substantially adjacent the second end 34 of the axle 22. Preferably, the effective outer diameter of the threads 51 is larger than the effective outer diameter of the threads 52. The external threads 51 are configured and arranged to fixedly secure the first end mounting structure 24 thereto. The second external threads 52 are configured and arranged to fixedly couple the second end mounting structure 26 thereto.

Preferably, the fastener arrangement 38 includes a mounting bolt 38a, a washer 38b and a locking ring 38c. The mounting bolt 38a has external threads that mate with the internal threads 42 of the axle 22. Preferably, the mounting bolt 38a is a hollow member with a bore having a torque transmitting surface. The mounting bolt 38a has an annular flange that abuts a flange of the left crank arm 20 to apply an axial force that maintains the left crank arm 20 on the second end 34 of the axle 22. Preferably, the washer 38b is disposed between the annular flange of the mounting bolt 38a and the left crank arm 20. The locking ring 38c is threaded into the left crank arm 20 and is configured and arranged to abut the annular flange of the mounting bolt 38a. Preferably, the locking ring 38c has a plurality of blind bores that are circumferentially spaced apart for receiving an installation tool.

The first end mounting structure 24 preferably includes a right cone 60, a right cup 61, a plurality of ball bearings 62 and a right end seal 63. The first end mounting structure 24 rotatably supports the first end 32 of the axle 22 to the bottom bracket tube 14. In particular, the right cone 60, the right cup 61 and the ball bearings 62 form a first bearing set or unit. The right cone 60, the right cup 61 and the ball bearings 62 are constructed of a hard rigid material that is conventionally used in the bicycle art.

Figure 3:
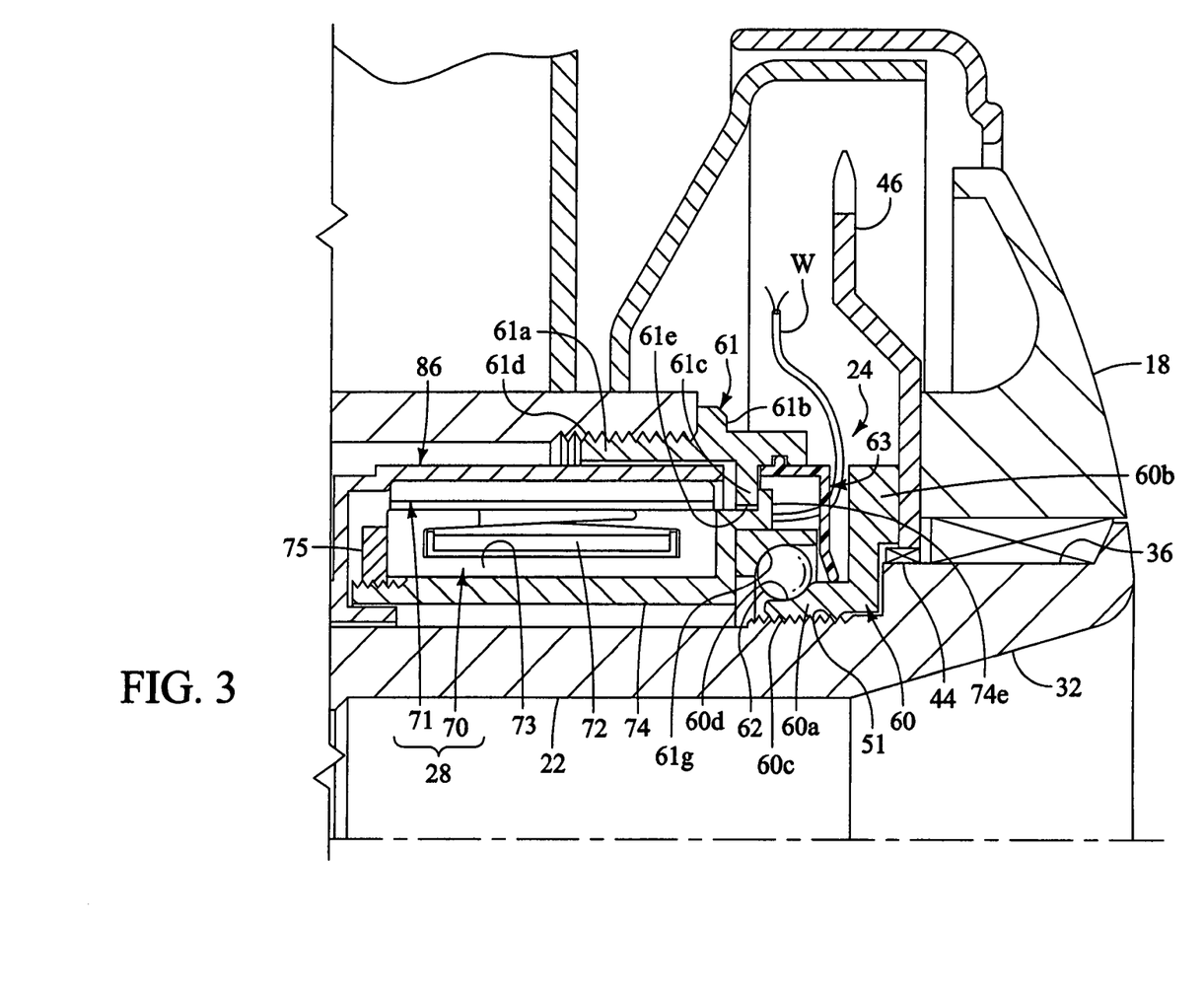
FIG. 3 is an enlarged, partial longitudinal cross-sectional view of the right hand end of bicycle bottom bracket structure illustrated in FIGS. 1 and 2 in accordance with the first embodiment of the present invention.

As best seen in FIGS. 2 and 3, the right cone 60 is preferably an annular member that has a tubular portion 60a and an annular flange portion 60b. The tubular portion 60a has internal threads 60c that engage the external threads 51 of the axle 22 for securing the first end mounting structure 24 to the axle 22. The tubular portion 60a also has an annular concaved surface 60d that rotatably supports the ball bearings 62. The annular flange 60b of the right cone 60 is preferably stepped to form a pressing portion that applies an axial force to the sprocket 46 and the right crank arm 18. Accordingly, when the right cone 60 is mounted on the external threads 51 of the axle 22, an axial force is applied to the sprocket 46 and the right crank arm 18.

Figure 9:
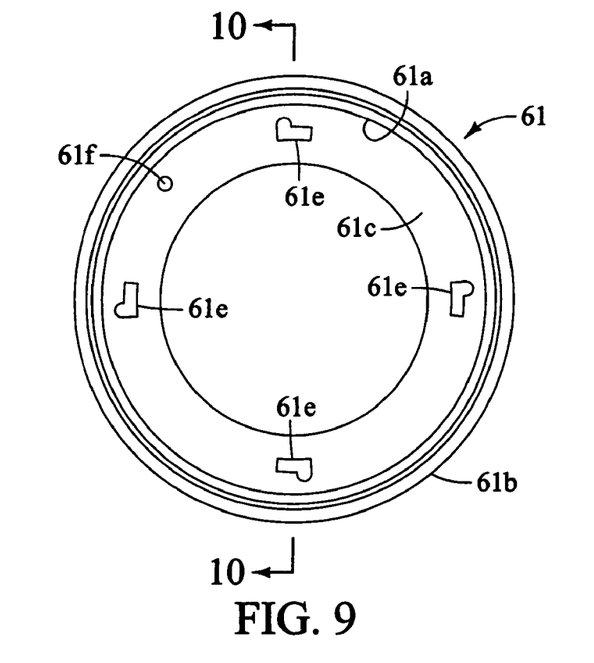
FIG. 9 is a left axial end elevational view of the right cup illustrated in FIGS. 2–5 in accordance with the first embodiment of the present invention.
Figure 10:
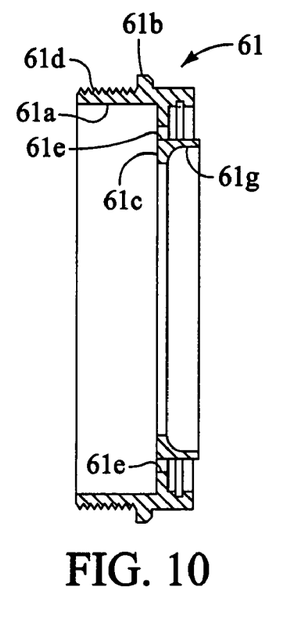
FIG. 10 is a cross-sectional view of the right cup as seen along section line 10—10 of FIG. 9 in accordance with the first embodiment of the present invention.
Figure 11:
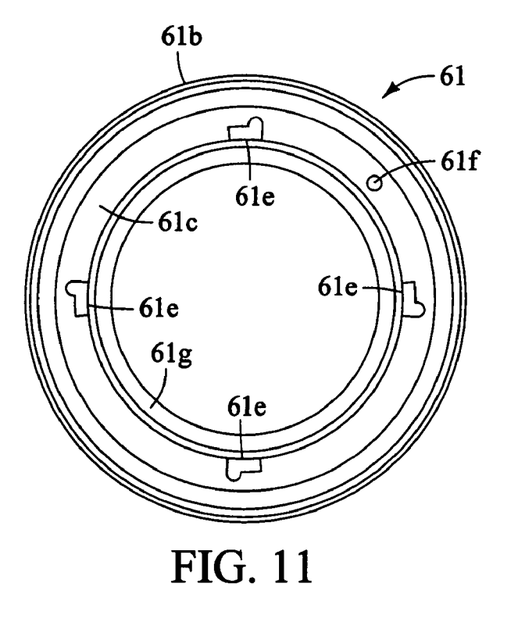
FIG. 11 is a right axial end elevational view of the right cup as seen in FIGS. 9 and 10.
Figure 12:
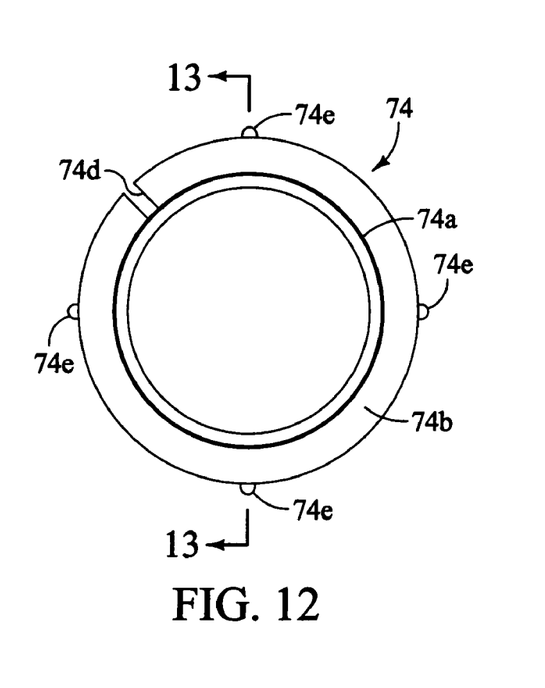
FIG. 12 is a left axial end elevational view of the mounting sleeve illustrated in FIGS. 2, 3 and 5 in accordance with the first embodiment of the present invention.
Figure 13:
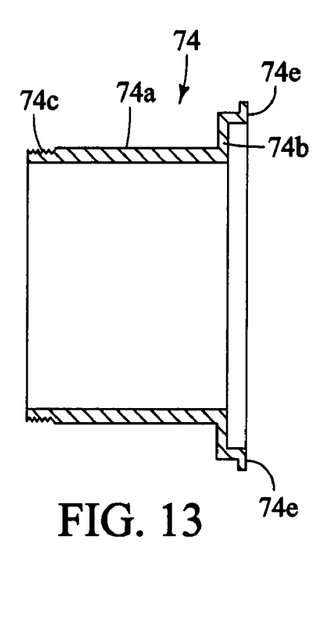
FIG. 13 is a longitudinal cross-sectional view of the mounting sleeve illustrated in FIG. 12 as seen along section line 13—13 of FIG. 12.
Figure 14:
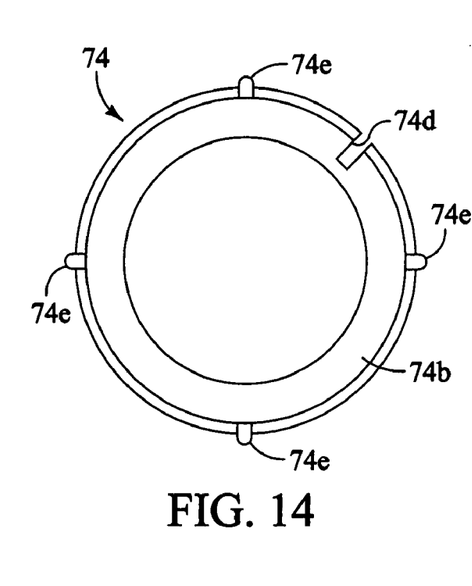
FIG. 14 is a right axial end elevational view of the right cup illustrated in FIGS. 10 and 11.
Figure 15:
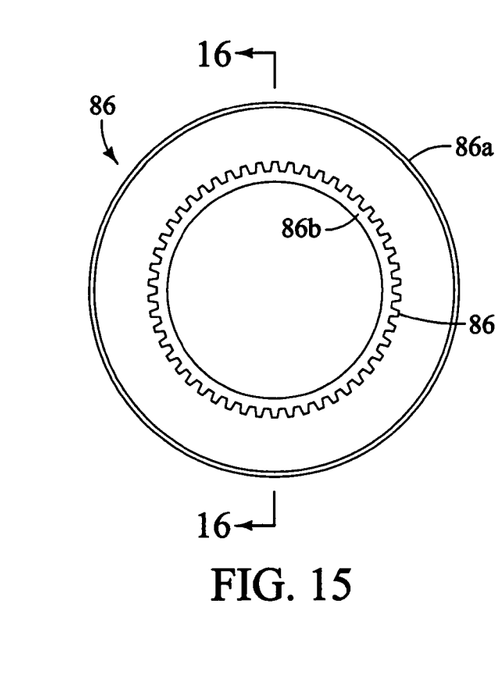
FIG. 15 is a left axial end elevational view of the sun gear illustrated in FIGS. 2, 3 and 5 in accordance with the first embodiment of the present invention.
Figure 16:
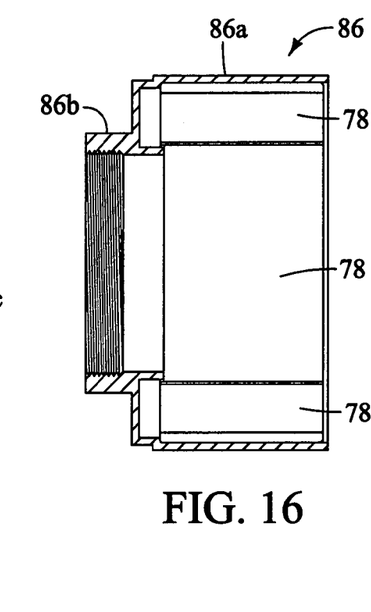
FIG. 16 is a cross-sectional view of the sun gear illustrated in FIG. 15 as seen along section line 16—16 of FIG. 15, with the permanent magnets mounted thereto.
Figure 17:
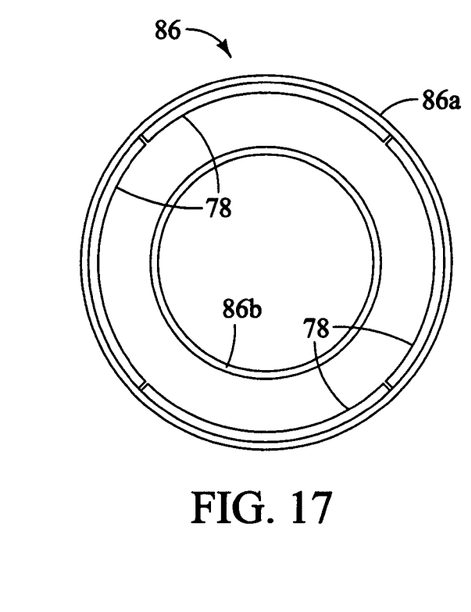
FIG. 17 is an outside axial end elevational view of the sun gear illustrated in FIGS. 15 and 16.

As best seen in FIGS. 9, 10 and 11, the right cup 61 is preferably constructed of a hard rigid material. The right cup 61 is fixedly mounted to the bottom bracket tube 14. The right cup 61 is preferably a tubular member that includes a tubular portion 61a, an outer abutment flange 61b and an inner annular flange 61c. Preferably, the tubular portion 61a also has external threads 61d that engage internal threads of the bottom bracket tube 14. Preferably, the threads 61d are left hand threads. The exterior annular flange 61b is an abutment member that engages the axial right end of the bottom bracket tube 14 when the right cup 61 is fully installed in the bottom bracket tube 14. Preferably, the outer annular flange 61b has a torque transmitting profile (not shown) such as notches for easy installation.

The inner annular flange 61c preferably has four twist lock cutouts 61e. These twist lock cutouts have a substantially L-shaped configuration for mounting a portion of the dynamo 28 thereto. The inner annular flange 61c also preferably has a wire access hole 61f for receiving an electrical wire W of the dynamo 28 therethrough. The inner end of the inner annular flange 61c has a concaved bearing surface 61g that supports the ball bearings 62 for rotation. Accordingly, the ball bearings 62 are rotatably supported between the bearing surface 60d of the right cone 60 and the bearing surface 61g of the right cup 61 such that the axle 22 can rotate relative to the bottom bracket tube 14. Preferably, the ball bearings 62 are constructed of a hard rigid material such as a metal material.

Preferably, the sealing member 63 is constructed of a flexible, resilient seal type material such as an elastomeric material. The seal 63 is preferably mounted in an internal groove formed on the internal surface of the tubular portion 61a.

As seen in FIG. 2, the second end mounting structure 26 basically includes a left cone 64, a left cup 65, a plurality of ball bearings 66 and an annular end seal 67. The second end mounting structure 26 is thus configured and arranged to rotatably support the left end 34 of the axle 22 relative to the bottom bracket tube 40. The left cone 65, the left cup 65 the ball bearings 66 are constructed of a hard rigid material that is conventionally used in the bicycle art.

The left cone 64 is a tubular member that has a set of internal threads 64a and an annular concave bearing surface 64b and a plurality of splines or serrations 64c. Preferably, the outer peripheral surface of the left cone 64 has a torque transmitting profile (not shown) such as notches, splines or serrations for easy installation. The internal threads 64a threadedly engage the external threads 52 of the axle 22 for securing the second end mounting structure 26 thereto. The concave bearing surface 64b is formed on the outer peripheral surface of the left cone 64 and rotatably supports the ball bearings 66 in a conventional manner. The splines or serrations 64c are formed on the outer peripheral surface of the left cone 64. The splines or serrations 64c are configured and arranged to fixedly secure the planetary gear unit 30 thereto as explained below.

Preferably, the left cone 64 is prevented from accidentally loosening by a locking nut 68 and a washer 69 that are installed onto the axle 22. In particular, the nut 68 has internal threads that engage the external threads 52 so as to apply an axial force to the left cone 64.

As seen in FIG. 2, the left cup 65 is preferably formed of a hard rigid material such as a metal material. The left cup 65 is fixedly coupled to the left end of the bottom bracket tube 14. In the illustrated embodiment, the left cup 65 is a tubular member having an outer tubular member 65a, an annular abutment flange 65b and an inner annular flange 65c. The outer surface of the tubular portion 65a is provided with external threads 65d that threadedly engage the threads on the left end of the bottom bracket tube 14. Preferably, the threads 65d are right hand threads. The abutment flange 65b extends from the outer end of the tubular portion 65a so as to form an annular abutment that contacts the end of the bottom bracket tube 14 when the left cup 64 is fully threaded into the left end of the bottom bracket tube 14. Preferably, the outer peripheral surface of the annular flange 65d is provided with a plurality of notches that form a torque transmitting surface (not shown).

The inner annular flange 65c preferably includes a plurality of serrations or splines 65e formed on the interior side of the inner annular flange 65c for engaging the planetary gear unit 30 as explained below. Moreover, the inner annular flange 65c preferably has an annular concaved bearing surface 65f that rotatably supports the ball bearings 66.

Preferably, the end seal 67 is mounted in a groove that is formed on an axially extending part of the inner annular flange 65c. Thus, the seal 67 is arranged to prevent contamination from entering the bottom bracket structure 12 via the gap between the left cone 64 and the left cup 65.

Still referring to FIG. 2, the dynamo or electric generating mechanism 28 is generally a relatively conventional component. Thus, the dynamo 28 will not be discussed or illustrated in detail herein, except to the extent that it pertains to the present invention. Basically, the dynamo 28 includes a yoke unit 70 and a magnet unit 71. The yoke unit 70 constitutes a stationary part, while the magnet unit 71 constitutes a rotational part. Thus, in this embodiment, the yoke unit 70 is configured and arranged to be supported and fixed to the bottom bracket tube 14, while the magnet unit 71 is configured and arranged to rotate with the axle 22 via the planetary gear unit 30.

As seen in FIGS. 2 and 3, the yoke unit 70 basically includes a generating coil 72, a yoke 73, a mounting sleeve 74 and a fixing nut 75. The generating coil 72 forms a stator having a bobbin onto which a coil is wound. The generating coil 72 has a cord or wire W that is connected to one or more electrical devices such as the electric shifters shown in FIG. 1. In other words, the rotation of the generating coil 72 relative to the magnet unit 71 generates electrical energy that is transmitted via the cord W to the electrical devices. The yoke 73 is preferably constructed of a pair of cup-shaped members that include claws for surrounding and supporting the generating coil 72. For example, the construction of the generating coil 72 and the yoke 73 can be configured and arranged similar to the corresponding parts of the dynamo disclosed in U.S. Pat. No. 6,409,197. The yoke 73 is secured on the outer peripheral surface of the mounting sleeve 74.

Preferably, the mounting sleeve 74 is constructed of a hard rigid material. As best seen in FIGS. 3 and 12–14, the mounting sleeve 74 is a tubular member having a tubular portion 74a and an annular abutment portion 74b. The annular abutment portion 74b extends radially outwardly from a first end of the tubular portion 74a. The second end of the tubular portion 74a has external threads 74c that threadedly receives the fixing nut 75. When the fixing nut 75 is threaded onto the tubular portion 74a via the threads 74c, then the generating coil 72 and the yoke 73 are fixedly mounted thereto. Preferably, the fixing nut 75 applies a sufficient axial force such that the generating coil 72 and the yoke 73 do not rotate relative to the mounting sleeve 74. The annular flange 74b is provided with a wiring opening or slot 74d such that the electrical cord W can pass therethrough. The annular flange 74b also preferably includes a plurality of detent members 74e. The detent members 74e are configured and arranged such that they are received in the twist lock openings 61e of the right cup 61. In particular, the detent members 74e are inserted into the enlarged area of the twist lock openings 61e and then the mounting sleeve 74 is twisted or rotated relative to the right cup 61 such that the detent members 74e move circumferentially within the twist lock openings 61e to fixedly secure the mounting sleeve 74 to the right cup 61. Since the right cup 61 is fixed to the bottom bracket tube 14, the yoke unit 70 is also fixedly coupled to the bottom bracket tube 14 via the right cup 61.

Referring back to FIGS. 2–5, the planetary gear unit 30 basically includes a ring gear 81, a fixing ring 82, a retaining clip 83, a gear holder 84, three planetary gears 85 and a sun gear 86. The magnetic unit 71 is fixedly mounted to the sun gear 86 such that the magnetic unit 71 rotates with the sun gear 86 around the yoke unit 70. Accordingly, the planetary gear unit 30 is coupled between the axle 22 and the magnetic unit 71 of the dynamo 28 such that the magnetic unit (rotational part) 71 of the dynamo 28 rotates at a faster rate than the rotational rate of the axle 22. Preferably, the magnetic unit 71 includes a plurality of magnets that are circumferentially disposed in a concentric manner around the yoke unit 70. In particular, the permanent magnets are mounted to the planetary gear unit 30 such that rotation of the axle 22 is transferred to the permanent magnets such that the permanent magnets rotate at a faster rate than the axle 22.

Figure 4:
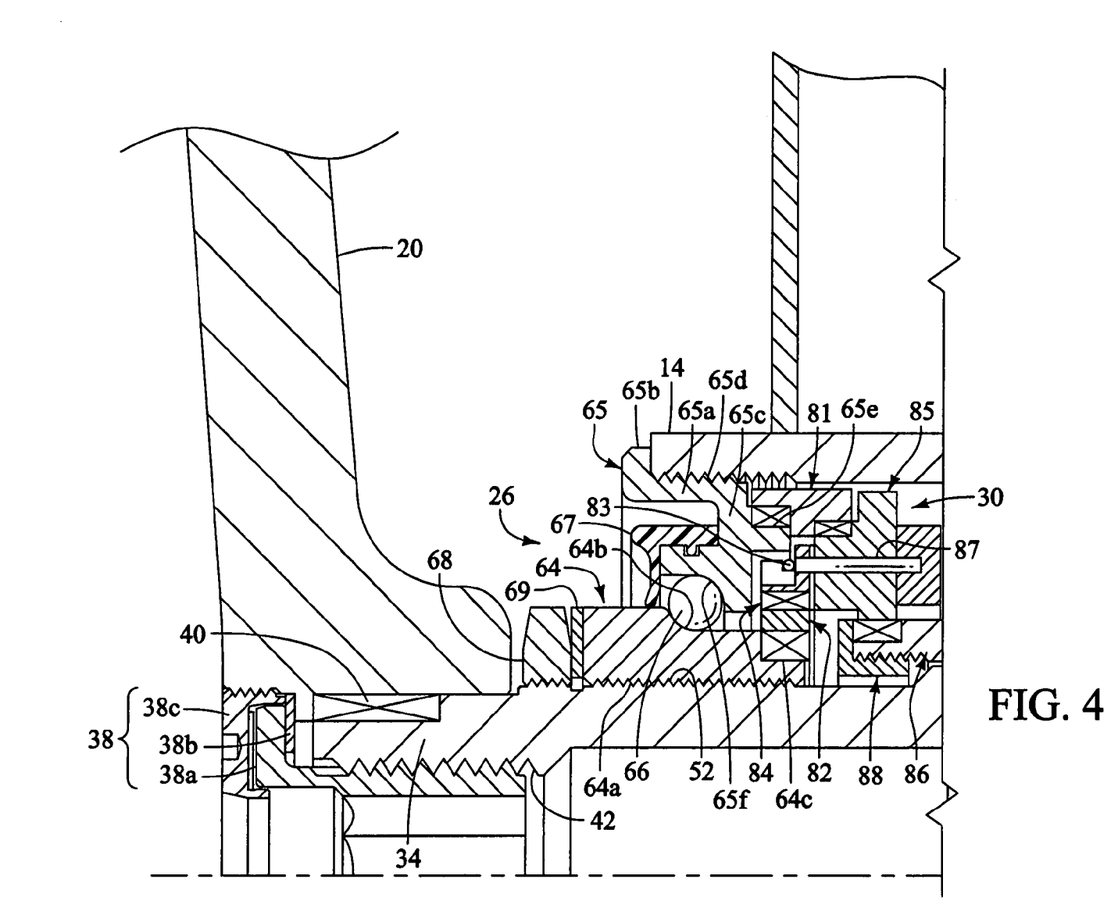
FIG. 4 is an enlarged, partial longitudinal cross-sectional view of the right hand end of bicycle bottom bracket structure illustrated in FIGS. 1–3 in accordance with the first embodiment of the present invention.
Figure 5:
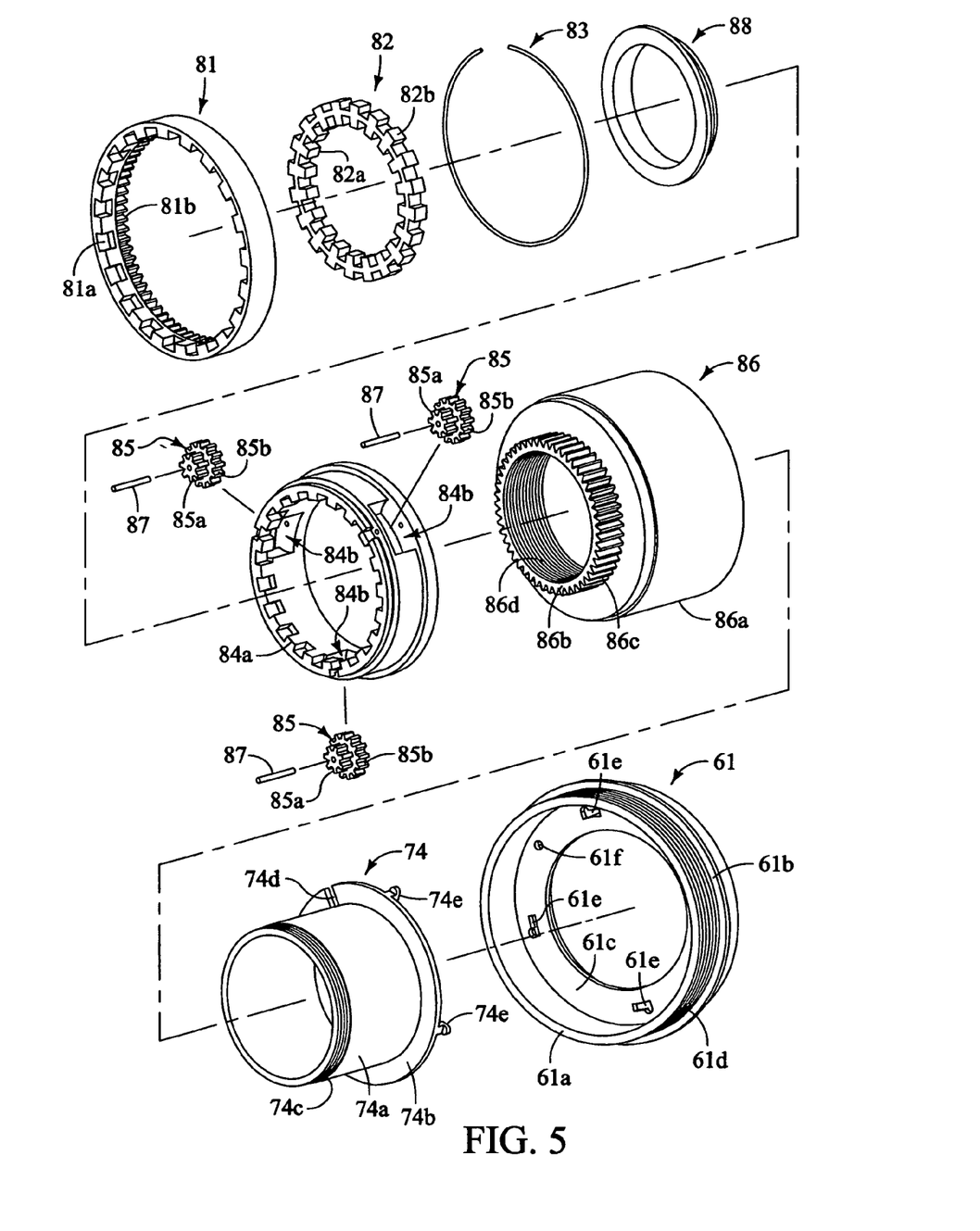
FIG. 5 is an exploded perspective view of selected parts of the bicycle bottom bracket structure illustrated in FIGS. 1–4 in accordance with the first embodiment of the present invention.
Figure 6:
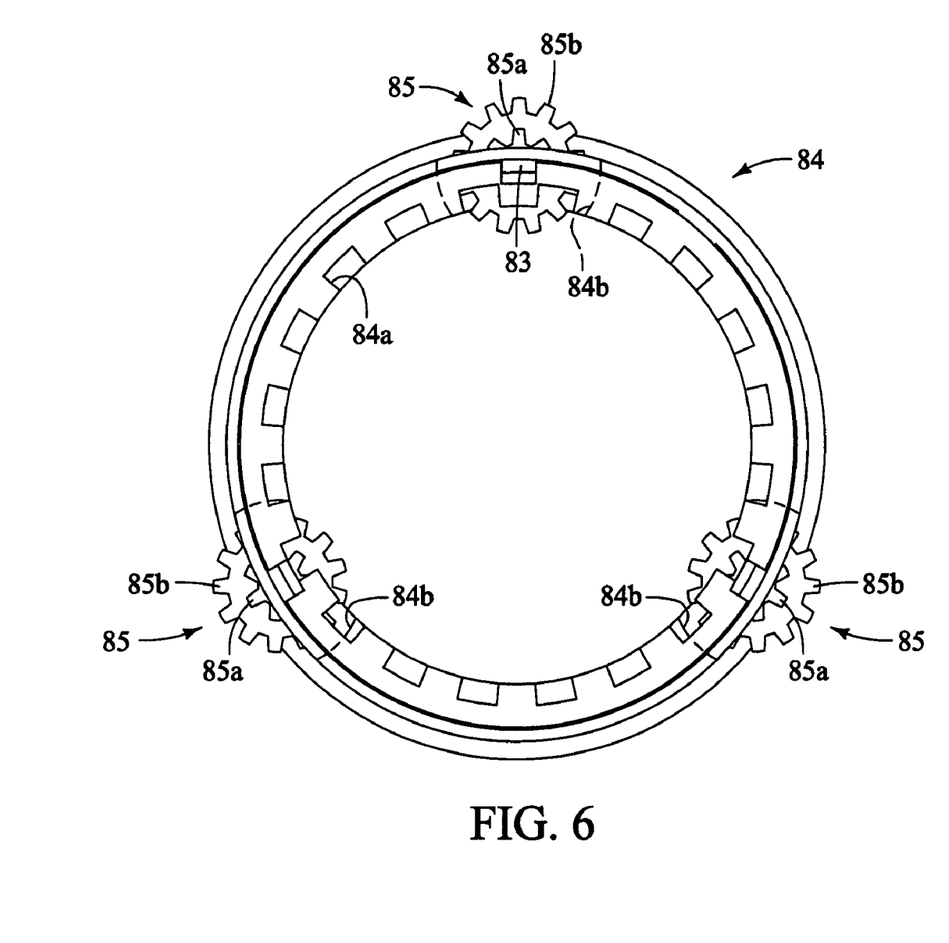
FIG. 6 is a left axial end elevational view of the gear holder illustrated in FIGS. 2–5 with the planetary gears mounted thereto in accordance with the first embodiment of the present invention.
Figure 7:
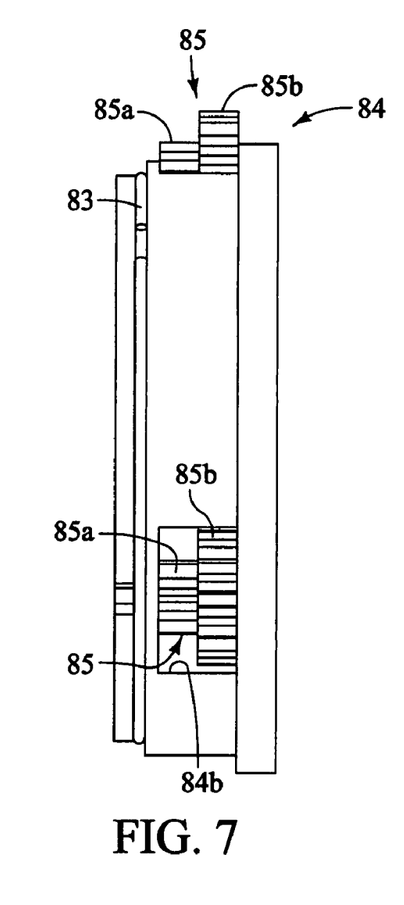
FIG. 7 is a side elevational view of the gear holder and the planetary gears illustrated in FIG. 6 in accordance with the first embodiment of the present invention.
Figure 8:
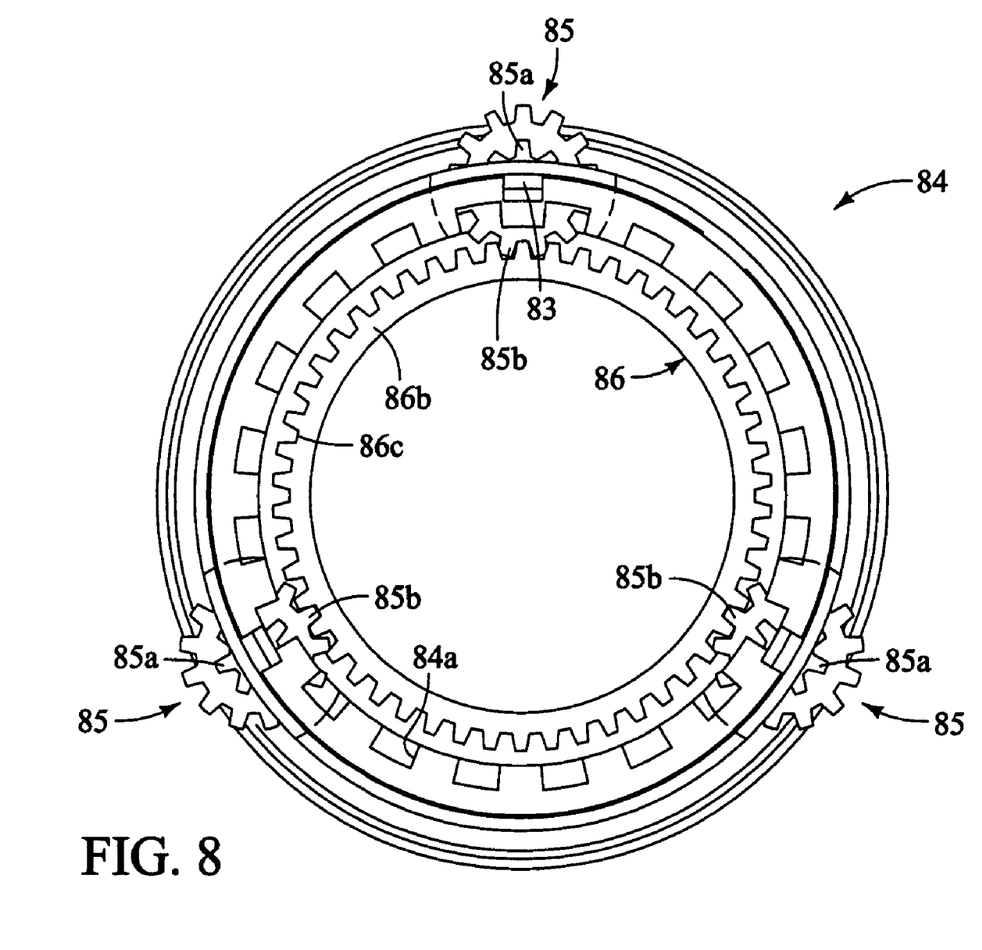
FIG. 8 is a left axial end elevational view of the sun gear engaged with the planetary gears that are mounted on the gear holder in accordance with the first embodiment of the present invention.

As seen in FIGS. 2, 4 and 5, the ring gear 81 is an annular member that is constructed of a hard rigid material. Preferably, the ring gear 81 has a plurality of internal serrations or splines 81a and a plurality of internal gear teeth 81b. The internal serrations 81a engage the external serrations 65e of the left cup 65. Thus, the ring gear 81 is fixed to the left cup 65 which in turn is fixed to the bicycle bottom bracket tube 14. In other words, the ring gear 81 does not rotate relative to the bottom bracket tube 14. The internal gear teeth 81b engages the teeth of the planetary gears 85 so as to control the rotation of the planetary gears 85 as discussed below.

As seen in FIGS. 2, 4 and 5, the fixing ring 82 includes a plurality of internal serrations or splines 82a and a plurality of external serrations or splines 82b. The internal serrations 82a engage the external serrations 64c of the left cone 64 such that the fixing ring 82 rotates with the axle 22. The external serrations 82b engage the gear holder 84 such that the gear holder 84 does not rotate relative to the fixing ring 82. Accordingly, the gear holder 84 rotates with the axle 22.

As seen in FIGS. 2, 4 and 5, the gear holder 84 is a tubular member that is constructed of a hard rigid material. The gear holder 84 has a plurality of internal serrations or splines 84a that engage the external serrations 82b of the fixing ring 82 such that the gear holder 84 and the fixing ring 82 are fixed relative to each other. The gear holder 84 also includes three planetary gear openings 84b that are spaced 120 degrees apart at their centers. The planetary gear openings 84b receive the planetary gears 85 therein. In particular, pins 87 rotatably secure the planetary gears 85 to the gear holder 84. Accordingly, when the axle 22 is rotated, the gear holder 84 rotates with the axle 22, while the planetary gears 85 are caused to rotate due to their engagement with the ring gear 81.

In particular, the planetary gears 85 include a first gear portion 85a and a second gear portion 85b. The first gear portion 85a has a smaller diameter with a smaller number of circumferentially spaced teeth than the second gear portion 85b. The teeth of the first gear portion 85a are engaged with the gear teeth 81b of the ring gear 81. Thus, when the gear holder rotates the engagement of the teeth of the first gear portion 85a with the gear teeth 81b of the ring gear 81 causes the planetary gears 85 to rotate. This rotation of each of the planetary gears 85 is transmitted to the sun gear 86 such that the sun gear 86 rotates about the axle 22 at a faster rate.

As seen in FIGS. 2, 3, 5 and 15–17, the sun gear 86 includes a first tubular portion 86a and a second tubular portion 86b. The first tubular portion 86a has the permanent magnets 78 mounted to it internal surface. Thus, the permanent magnets 78 rotate with the sun gear 86. The second tubular portion 86b has external gear teeth 86c and internal threads 86d. The external gear teeth 86c engage the gear teeth of the second gear portion 85b of the planetary gears 85. Accordingly, rotation of the planetary gears 85 causes the sun gear 86 to rotate.

Preferably, as seen in FIGS. 2 and 3, a locking ring 88 is threaded onto the internal threads 86d of the sun gear 86. The locking ring 88 has an annular abutment flange that is configured and arranged to hold the planetary gears 85 onto the external gear teeth 86c.

As used herein to describe present invention, the following directional terms "forward, rearward, above, downward, vertical, horizontal, below and transverse" as well as any other similar directional terms refer to those directions of a bicycle equipped with the present invention. Accordingly, these terms, as utilized to describe the present invention should be interpreted relative to a bicycle equipped with the present invention. The terms of degree such as "substantially", "about" and "approximately" as used herein mean a reasonable amount of deviation of the modified term such that the end result is not significantly changed. These terms should be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:

1. A bicycle bottom bracket structure comprising:
an axle adapted to be rotationally mounted relative to a bicycle frame, the axle having a first end and a second end;
a dynamo having a stationary part including a yoke unit and a rotational part including a magnet unit that is operatively coupled to the axle in order to rotate in response to rotation of the axle relative to the stationary part; and
a planetary gear unit coupled between the axle and the rotational part of the dynamo such that the magnet unit of the rotational part rotates faster relative to the yoke unit of the stationary part than the axle in response to rotation of the axle relative to the stationary part of the dynamo, the stationary part of the dynamo being disposed concentrically within the rotational part of the dynamo.

2. A bicycle bottom bracket structure comprising:
an axle having a first end and a second end;
a dynamo mounted to the axle, and having a stationary part including a yoke unit and a rotational part including a magnet unit; and a planetary gear unit coupled between the axle and the rotational part of the dynamo such that the rotational part of the dynamo rotates faster than the axle, the stationary part of the dynamo being disposed concentrically within the rotational part of the dynamo.

3. The bicycle bottom bracket structure according to claim 1, wherein the planetary gear unit includes a sun gear mounted to the rotational part of the dynamo, and a primary planet gear mounted to rotate with the axle, the primary planet gear being engaged with the sun gear to rotate the sun gear as the axle is rotated.

4. The bicycle bottom bracket structure according to claim 3, wherein the planetary gear unit further includes a plurality of the primary planet gears mounted to rotate with the axle and being engaged with the sun gear to rotate the sun gear as the axle is rotated.

5. The bicycle bottom bracket structure according to claim 3, wherein the planetary gear unit further includes a gear holder mounted to rotate with the axle, and the gear holder supporting the primary planet gear.

6. A bicycle bottom bracket structure comprising:

an axle having a first end and a second end;

a dynamo mounted to the axle, and having a stationary part including a yoke unit and a rotational part including a magnet unit; and a planetary gear unit coupled between the axle and the rotational part of the dynamo such that the rotational part of the dynamo rotates faster than the axle, the planetary gear unit including a sun gear mounted to the rotational part of the dynamo, a primary planet gear mounted to rotate with the axle, a gear holder mounted to rotate with the axle, a stationary ring gear configured and arranged to be fixed to a fixed frame portion, and a secondary planet gear mounted to the gear holder, the primary planet gear being engaged with the sun gear to rotate the sun gear as the axle is rotated, the gear holder supporting the primary planet gear, and the secondary planet gear being engaged with the stationary ring gear.

7. A bicycle bottom bracket structure comprising:

an axle having a first end and a second end;

a dynamo mounted to the axle, and having a stationary part including a yoke unit and a rotational part including a magnet unit; and a planetary gear unit coupled between the axle and the rotational part of the dynamo such that the rotational part of the dynamo rotates faster than the axle, the yoke unit being mounted on a sleeve disposed concentrically within the rotational part of the dynamo.

8. The bicycle bottom bracket structure according to claim 7, wherein the sleeve of the stationary part of the dynamo has a mounting structure at one end.

9. The bicycle bottom bracket structure according to claim 8, wherein the mounting structure of the sleeve has a wire access opening with an electrical cord of the yoke unit disposed therein.

10. The bicycle bottom bracket structure according to claim 8, wherein the sleeve has a wire access opening with an electrical cord of the yoke unit disposed therein.

11. The bicycle bottom bracket structure according to claim 8, wherein the mounting structure of the sleeve is attached to an outer cup of a bearing set.

12. The bicycle bottom bracket structure according to claim 11, wherein the sleeve and the outer cup have wire access openings with an electrical cord of the yoke unit disposed therein.

13. The bicycle bottom bracket structure according to claim 2, wherein the planetary gear unit includes a sun gear mounted to the rotational part of the dynamo, and a primary planet gear mounted to rotate with the axle, the planet gear being engaged with the sun gear to rotate the sun gear as the axle is rotated.

14. The bicycle bottom bracket structure according to claim 13, wherein the planetary gear unit further includes a plurality of the primary planet gears mounted to rotate with the axle and being engaged with the sun gear to rotate the sun gear as the axle is rotated.

15. The bicycle bottom bracket structure according to claim 13, wherein the planetary gear unit further includes a gear holder mounted to rotate with the axle, and the gear holder supporting the primary planet gear.

16. The bicycle bottom bracket structure according to claim 15, wherein the planetary gear unit further includes a stationary ring gear configured and arranged to be fixed to a fixed frame portion, and a secondary planet gear mounted to the gear holder, the secondary planet gear being engaged with the stationary ring gear.

17. The bicycle bottom bracket structure according to claim 16, wherein the stationary ring gear is mounted to a first outer cup of a first bearing set, and the stationary part of the dynamo has a mounting structure that is attached to an outer cup of a bearing set.

* * * * *